United States Patent
Han et al.

(10) Patent No.: US 11,894,554 B2
(45) Date of Patent: Feb. 6, 2024

(54) CATHODE ACTIVE MATERIAL FOR LITHIUM SECONDARY BATTERY, METHOD FOR PREPARING SAME, AND LITHIUM SECONDARY BATTERY COMPRISING SAME

(71) Applicant: Samsung SDI Co., Ltd., Yongin-si (KR)

(72) Inventors: Jungmin Han, Yongin-si (KR); Kihyun Kim, Yongin-si (KR); Jaeho Lee, Yongin-si (KR); Ming-Zi Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1070 days.

(21) Appl. No.: 16/320,057

(22) PCT Filed: Aug. 22, 2017

(86) PCT No.: PCT/KR2017/009165
§ 371 (c)(1),
(2) Date: Jan. 23, 2019

(87) PCT Pub. No.: WO2018/038509
PCT Pub. Date: Mar. 1, 2018

(65) Prior Publication Data
US 2021/0280862 A1  Sep. 9, 2021

(30) Foreign Application Priority Data

Aug. 23, 2016  (KR) .......................... 10-2016-0107110

(51) Int. Cl.
*H01M 4/38*  (2006.01)
*H01M 4/505*  (2010.01)
(Continued)

(52) U.S. Cl.
CPC .......... *H01M 4/505* (2013.01); *H01M 4/382* (2013.01); *H01M 4/525* (2013.01); *H01M 10/0525* (2013.01)

(58) Field of Classification Search
CPC ....... H01M 4/8605; H01M 2008/1293; H01M 2300/0074; H01M 8/1246; H01M 4/485;
(Continued)

(56) References Cited

U.S. PATENT DOCUMENTS

| | | | |
|---|---|---|---|
| 7,314,682 B2 * | 1/2008 | Thackeray | C01G 45/1228 429/223 |
| 2006/0127769 A1 | 6/2006 | Fujimoto et al. | |

(Continued)

FOREIGN PATENT DOCUMENTS

| | | |
|---|---|---|
| JP | 2010-126422 A | 6/2010 |
| JP | 5843046 B2 | 1/2016 |

(Continued)

*Primary Examiner* — Kourtney R S Carlson
(74) *Attorney, Agent, or Firm* — Lewis Roca Rothgerber Christie LLP

(57) ABSTRACT

Provided are a cathode active material for a lithium secondary battery, a method for preparing the same, and a lithium secondary battery comprising the same. The cathode active material for a lithium secondary battery comprises: a lithium metal compound; and a lithium compound disposed on the surface of the lithium metal compound, wherein the content of lithium contained in the lithium compound is 0.25 parts by weight or less with respect to 100 parts by weight of the lithium metal compound, wherein the specific surface area of the lithium compound is between 0.5 m²/g and 2.0 m²/g, and the pH of the lithium compound is between 11.5 and 12.3.

11 Claims, 1 Drawing Sheet

(51) Int. Cl.
*H01M 4/525* (2010.01)
*H01M 10/0525* (2010.01)

(58) Field of Classification Search
CPC ...... H01M 4/525; H01M 4/505; H01M 4/382; Y02E 60/50
USPC .................................................. 429/482, 456
See application file for complete search history.

(56) References Cited

U.S. PATENT DOCUMENTS

| | | |
|---|---|---|
| 2009/0200509 A1* | 8/2009 | Suzuki .................. H01M 4/505 |
| | | 252/182.1 |
| 2010/0136412 A1 | 6/2010 | Watanabe |
| 2014/0186709 A1 | 7/2014 | Iwanaga et al. |
| 2015/0194662 A1 | 7/2015 | Yang et al. |
| 2016/0043383 A1* | 2/2016 | Hamada .............. H01M 4/0471 |
| | | 252/182.1 |
| 2018/0316010 A1 | 11/2018 | Nakayama et al. |

FOREIGN PATENT DOCUMENTS

| | | | |
|---|---|---|---|
| KR | 10-1012539 B1 | 2/2011 | |
| KR | 10-2013-0080565 A | 7/2013 | |
| KR | 10-2014-0039000 A | 3/2014 | |
| KR | 10-2014-0081663 A | 7/2014 | |
| KR | 10-2015-0079362 A | 7/2015 | |
| KR | 10-1640442 B1 | 7/2016 | |
| WO | WO-2014142314 A1 * | 9/2014 | .......... H01M 4/0471 |

\* cited by examiner

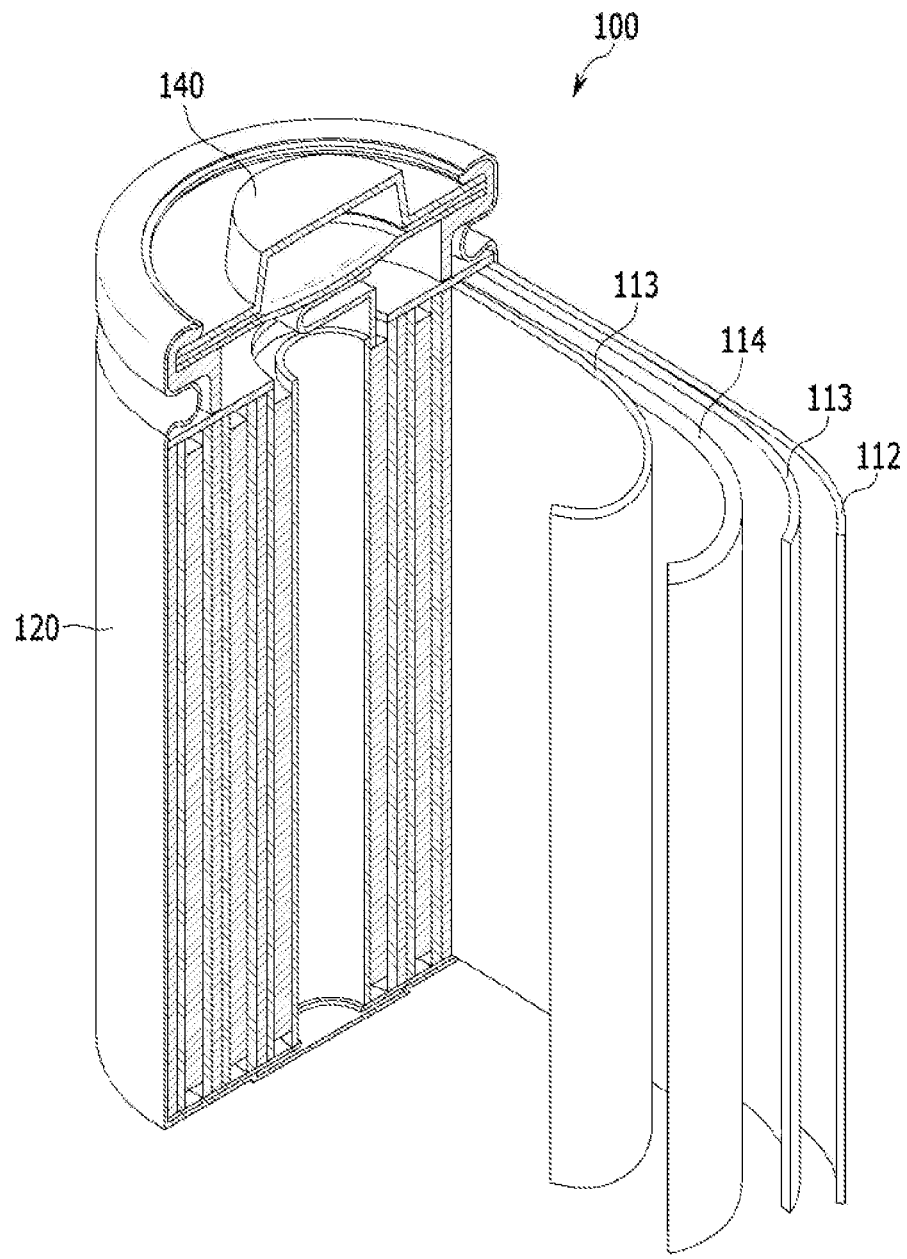

CATHODE ACTIVE MATERIAL FOR LITHIUM SECONDARY BATTERY, METHOD FOR PREPARING SAME, AND LITHIUM SECONDARY BATTERY COMPRISING SAME

CROSS-REFERENCE TO RELATED APPLICATION(S)

This application is a National Phase Patent Application of International Patent Application Number PCT/KR2017/009165, filed on Aug. 22, 2017, which claims priority of Korean Patent Application No. 10-2016-0107110, filed Aug. 23, 2016. The entire contents of both of which are incorporated herein by reference.

TECHNICAL FIELD

A cathode active material for a lithium secondary battery, a method for preparing the same, and a lithium secondary battery including the same are disclosed.

BACKGROUND ART

Recently, electronic devices have been developed to have a smaller size and a lighter weight according to growing the high-tech electronic industry, so portable electronic devices are being more employed. A battery having a high energy density as a power source for such portable electronic devices has been required, and research on a lithium secondary battery has been actively made.

Such a lithium secondary battery is manufactured by injecting an electrolyte solution into a battery cell which includes a cathode including a cathode active material capable of intercalating/deintercalating lithium and an anode including an anode active material capable of intercalating/deintercalating lithium.

As for the cathode active material, $LiCoO_2$ has been widely used. Recently, the lithium secondary battery has been more widely adopted from a portable information electronic device to a power tool, an electric vehicle, and the like and thus more required of high capacity, high power, and stability, and accordingly, research on improving performance of $LiCoO_2$ and developing an alternative material such as a ternary component-based material and an olivine-based material has been actively made.

Particularly, a lithium nickel-based oxide having a high nickel content enables a high capacity and exhibits excellent electrochemical properties. However, there is a large amount of residual lithium on the surface, which degrades cycle characteristics and low stability, and thus it is impossible to use for a long time.

DISCLOSURE

Technical Problem

An embodiment is to provide a cathode active material for a lithium secondary battery which exhibits a high capacity and has excellent cycle-life characteristics and rate characteristics, a small amount of gas generation, and excellent stability.

Another embodiment is to provide a method of preparing the cathode active material.

Yet another embodiment is to provide a lithium secondary battery including the cathode active material.

Technical Solution

An embodiment provides a cathode active material for a lithium secondary battery including a lithium metal compound and a lithium compound disposed on the surface of the lithium metal compound, wherein the lithium metal compound is different from the lithium compound, the content of lithium contained in the lithium compound is 0.25 parts by weight or less with respect to 100 parts by weight of the lithium metal compound, a specific surface area is 0.5 $m^2/g$ to 2.0 $m^2/g$, and pH is 11.5 to 12.1.

The content of lithium contained in the lithium compound may be 0.05 parts by weight to 0.25 parts by weight with respect to 100 parts by weight of the lithium metal compound.

A specific surface area of the cathode active material may be 0.5 $m^2/g$ to 1.90 $m^2/g$.

The pH of the cathode active material may be 11.5 to 12.1.

The lithium metal compound may include lithium nickel-based oxide represented by Chemical Formula 1.

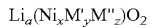  [Chemical Formula 1]

In Chemical Formula 1, M' is at least one selected from Co, Mn, Ni, Al, Mg, and Ti, M" is at least one selected from Ca, Mg, Al, Ti, Sr, Fe, Co, Mn, Ni, Cu, Zn, Y, Zr, Nb, and B, 0.8<a≤1.2, 0.6≤x≤1, 0≤y≤0.4, 0≤z≤0.4, and x+y+z=1.

For example, the lithium metal compound may include a lithium nickel-based oxide represented by Chemical Formula 2:

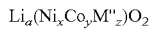  [Chemical Formula 2]

In Chemical Formula 2, M" is at least one element selected from Al and Mn, 0.8<a≤1.2, 0.6≤x≤1, 0≤y≤0.4, 0≤z≤0.4, and x+y+z=1.

The lithium compound may include $Li_2CO_3$, LiOH, or a combination thereof.

Another embodiment provides a method for preparing a cathode active material for a lithium secondary battery that includes washing a first active material with ammonia water to obtain a second active material, wherein the first active material and the second active material include a lithium metal compound and a lithium compound disposed on the surface of the lithium metal compound, the lithium metal compound is different from the lithium compound, and each content of a lithium compound included in the first active material and the second active material is different.

The ammonia water may include water and ammonia in a weight ratio of 50:50 to 95:5.

The pH of the ammonia water may be 11 to 13.

Another embodiment provides a lithium secondary battery including a cathode including the cathode active material.

Other embodiments are included in the following detailed description.

Advantageous Effects

By providing the cathode active material, it is possible to realize a lithium secondary battery having a high capacity, improved cycle-life characteristics and rate capability, and improved stability due to a low gas generation amount.

DESCRIPTION OF THE DRAWINGS

FIG. 1 is a schematic view of a lithium secondary battery according to an embodiment.

DESCRIPTION OF SYMBOLS

100: lithium secondary battery
112: anode

113: separator
114: cathode
120: battery case
140: sealing member

MODE FOR INVENTION

Hereinafter, embodiments of the present invention are described in detail. However, these embodiments are exemplary, the present invention is not limited thereto and the present invention is defined by the scope of claims.

Hereinafter, a cathode active material for a lithium secondary battery according to an embodiment is described.

A cathode active material for a lithium secondary battery according to an embodiment may include a lithium metal compound and a lithium compound disposed on the surface of the lithium metal compound.

The lithium metal compound may include a lithium nickel-based oxide. Specifically, the lithium nickel-based oxide may be represented by Chemical Formula 1.

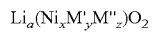  [Chemical Formula 1]

In Chemical Formula 1, M' is at least one selected from Co, Mn, Ni, Al, Mg, and Ti, M" is at least one selected from Ca, Mg, Al, Ti, Sr, Fe, Co, Mn, Ni, Cu, Zn, Y, Zr, Nb, and B, $0.8<a\leq1.2$, $0.6\leq x\leq1$, $0\leq y\leq0.4$, $0\leq z\leq0.4$, and $x+y+z=1$.

When the lithium nickel-based oxide represented by Chemical Formula 1, specifically, a lithium nickel-based oxide having a high nickel content is used as a cathode active material, a lithium secondary battery having improved electrochemical characteristics such as rate capability as well as high capacity may be realized.

Chemical Formula 1 may be for example a lithium nickel-based oxide represented by Chemical Formula 2.

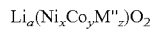  [Chemical Formula 2]

In Chemical Formula 2,
M" is at least one element selected from Al and Mn, $0.8<a\leq1.2$, $0.6\leq x\leq1$, $0\leq y\leq0.4$, $0\leq z\leq0.4$, and $x+y+z=1$.

The ternary-component lithium nickel cobalt manganese oxide represented by represented by Chemical Formula 2 may exhibit improved battery characteristics by combining merits such as high capacity of a lithium nickel oxide, thermal stability and economic feasibility of a lithium manganese (aluminum) oxide, and stable electrochemical characteristics of a lithium cobalt oxide.

The lithium compound disposed on the surface of the lithium metal compound may be a material that remains on the surface after synthesis of the lithium metal compound. Examples of such a lithium compound may include $Li_2CO_3$, LiOH, or a combination thereof, but are not limited thereto.

The content of lithium contained in the lithium compound may be included in an amount of 0.25 parts by weight or less, for example, 0.01 parts by weight to 0.25 parts by weight, 0.05 parts by weight to 0.25 parts by weight, or 0.05 parts by weight to 0.20 parts by weight with respect to 100 parts by weight of the lithium metal compound. When the lithium compound is present on the surface of the lithium metal compound within the above-mentioned amount ranges, the lithium secondary battery may exhibit cycle-life characteristics as well as high capacity and improved rate characteristics, and an amount of gas generated during a charging/discharging process may be decreased due to an amount decrease of residual lithium on the surface after synthesis of the lithium metal compound, and thus battery stability may be improved. More specifically, it may be included in an amount of 0.05 parts by weight to 0.15 parts by weight.

The cathode active material wherein lithium within the amount range is present on the surface of the lithium metal compound may be obtained by washing the lithium metal compound with ammonia water after synthesizing the lithium metal compound. A method of preparing the cathode active material using the washing method will be described later.

A specific surface area of the cathode active material wherein the lithium compound is disposed on the surface of the lithium metal compound may be 0.5 m²/g to 2.0 m²/g, for example, 0.5 m²/g to 1.90 m²/g, 0.5 m²/g to 1.85 m²/g, or 0.5 m²/g to 1.75 m²/g. When the specific surface area of the cathode active material is within the ranges, a lithium secondary battery having storage characteristics at a high temperature, excellent stability such as reduction of gas generation, and the like as well as high capacity, cycle-life characteristics, and rate capability may be realized. More specifically, it may be 0.5 m²/g to 1.65 m²/g, or 0.5 m²/g to 1.60 m²/g.

The pH of the cathode active material wherein the lithium compound is disposed on the surface of the lithium metal compound may be 11.5 to about 12.1, or 11.5 to 12.0. When the pH of the cathode active material is within the ranges a lithium secondary battery having storage characteristics at a high temperature, excellent stability such as reduction of gas generation, and the like as well as high capacity, cycle-life characteristics, and rate capability may be realized. More specifically, it may be 11.5 to 11.8.

Hereinafter, a method of preparing a cathode active material according to another embodiment is described.

The cathode active material may be prepared by washing a first active material with ammonia water to obtain a second active material. In other words, the second active material may be the cathode active material according to an embodiment.

The first active material is obtained after synthesizing a lithium metal compound, and a lithium compound is left on the surface of the synthesized lithium metal compound. In other words, the first active material may include a lithium metal compound and a lithium compound disposed on the surface of the lithium metal compound, and a content of the lithium compound remaining on the surface thereof may have a different from a content of the lithium compound remaining on the surface of the second active material.

The first active material obtained after the synthesis of the lithium metal compound is washed with ammonia water and thereby a residual amount of the lithium compound on the surface is decreased to obtain the above-mentioned cathode active material according to an embodiment, specifically, a cathode active material having the specific surface area and the pH in appropriate ranges. Accordingly, when washed with the ammonia water, the amount of residual lithium is decreased while minimizing changes in the active material of the lithium metal compound, thereby improving not only the electrochemical characteristics such as cycle-life characteristics but also the battery stability such as reduction of gas generation and storage characteristics at a high temperature. In addition, a capacity of the lithium secondary battery is not reduced, and cycle-life characteristics and storage characteristics at a high temperature may be significantly improved compared with when washed with pure water.

The lithium metal compound may be the lithium nickel-based oxide as described above, and specifically, the compound represented by Formula 1, for example, the compound represented by Formula 2 may be used. The lithium nickel-based oxide may be synthesized by a method known in this art, and thus a synthesis method thereof is not described herein.

The ammonia water may include water and ammonia and the water and ammonia may be included in a weight ratio of 50:50 to 95:5, for example, 70:30 to 95:5. When water and ammonia are mixed in the weight ratio ranges, the amount of residual lithium may be reduced while minimizing changes of the active material of the lithium metal compound, thereby further improving cycle-life characteristics, reduction of gas generation, and storage characteristics at a high temperature. More specifically, they may be included in a weight ratio of 90:10 to 95:5.

The pH of the ammonia water may be 11 to 13, 11 to 12.5, for example, 11.3 to 12.3. When the pH of the ammonia water is within the ranges, a lithium secondary battery having high capacity and improved cycle-life characteristics and rate capability, and storage characteristics at a high temperature may be realized.

A drying process may be further performed after the washing process. The drying process may be performed by heat-treating it at a temperature of 100° C. to 200° C. for 12 to 48 hours.

Hereinafter, a lithium secondary battery according to another embodiment is described referring to FIG. 1.

FIG. 1 is a schematic view showing a structure of a lithium secondary battery.

Referring to FIG. 1, a lithium secondary battery 100 according to an embodiment includes an electrode assembly including a cathode 114, a anode 112 facing the cathode 114, a separator 113 disposed between the cathode 114 and the anode 112, and an electrolyte solution (not shown) impregnating the cathode 114, the anode 112 and the separator 113, a battery case 120 housing the electrode assembly, and a sealing member 140 sealing the battery case 120.

The cathode 114 includes a current collector and a cathode active material layer formed on the current collector. The cathode active material layer includes a cathode active material, a binder, and optionally a conductive material.

The current collector may use Al, but is not limited thereto.

The cathode active material is the same as described above.

The binder improves binding properties of cathode active material particles with one another and with a current collector and specific examples may be polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode, any electrically conductive material may be used as a conductive material, unless it causes a chemical change, and examples thereof may be natural graphite, artificial graphite, carbon black, acetylene black, ketjen black, carbon fiber, copper, nickel, aluminum, silver, and the like, a metal powder, a metal fiber, and the like, and one or more kinds of a conductive material such as a polyphenylene derivative and the like may be mixed.

The anode 112 includes a current collector and a anode active material layer formed on the current collector.

The current collector may use Cu, but is not limited thereto.

The anode active material layer includes an anode active material, a binder, and optionally a conductive material.

The anode active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions is a carbon material, and may be any generally-used carbon-based negative active material in a lithium secondary battery, and examples thereof may be crystalline carbon, amorphous carbon, or a combination thereof. Examples of the crystalline carbon may be a graphite such as a shapeless, sheet-shaped, flake, spherical shaped or fiber-shaped natural graphite or artificial graphite, and examples of the amorphous carbon may be soft carbon (low temperature fired carbon) or hard carbon, a mesophase pitch carbonized product, fired cokes, and the like.

The lithium metal alloy may include an alloy of lithium and a metal of Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ (0<x<2), a Si—C composite, a Si-Q alloy (wherein Q is an alkali metal, an alkaline-earth metal, Group 13 to 16 elements, a transition metal, a rare earth element, or a combination thereof, and not Si), Sn, $SnO_2$, a Sn—C composite, Sn—R (wherein R is an alkali metal, an alkaline-earth metal, Group 13 to 16 elements, a transition metal, a rare earth element, or a combination thereof, and not Sn), and the like, and at least one thereof may be mixed with $SiO_2$. Specific examples of the Q and R may be, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and the like.

The binder improves binding properties of anode active material particles with one another and with a current collector, and examples thereof may be polyvinyl alcohol, carboxylmethyl cellulose, hydroxypropyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode, any electrically conductive material may be used as a conductive material, unless it causes a chemical change, and examples thereof may be a carbon-based material such as natural graphite, artificial graphite, carbon black, acetylene black, ketjen black, a carbon fiber, and the like; a metal-based material such as a metal powder or a metal fiber of copper, nickel, aluminum, silver, and the like; a conductive polymer such as a polyphenylene derivative; or a mixture thereof.

The anode 112 and the cathode 114 may be manufactured by preparing each active material, a conductive material, and a binder in a solvent to prepare slurry, and coating the slurry on each current collector. The solvent may use an organic solvent such as N-methylpyrrolidone, and the like, and the solvent may be an aqueous solvent such as water according to kinds of a binder, but is not limited thereto. The electrode manufacturing method is well known, and thus is not described in detail in the present specification.

The electrolyte solution includes an organic solvent and a lithium salt.

The organic solvent serves as a medium for transmitting ions taking part in the electrochemical reaction of a battery. The organic solvent may include a carbonate-based, ester-based, ether-based, ketone-based, alcohol-based, or aprotic solvent.

The carbonate-based solvent may include, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

Particularly, when a linear carbonate compound and a cyclic carbonate compound are mixed, a solvent having a high dielectric constant and a low viscosity may be provided. Herein, the cyclic carbonate compound and linear carbonate compound may be mixed together in a volume ratio ranging from 1:1 to 1:9.

The ester-based solvent may include, for example methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethyl alcohol, isopropyl alcohol, and the like.

The organic solvent may be used singularly or in a mixture, and when the organic solvent is used in a mixture, the mixture ratio may be controlled in accordance with a desirable battery performance.

The electrolyte solution may further include an overcharge inhibitor additive such as ethylene carbonate, pyrocarbonate, or the like.

The lithium salt is dissolved in an organic solvent, supplies lithium ions in a battery, basically operates the lithium secondary battery, and improves lithium ion transportation between a cathode and an anode therein.

Specific examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein, x and y are natural numbers), LiCl, LiI, LiB$(C_2O_4)_2$ (lithium bis(oxalato) borate; LiBOB), or a combination thereof.

The lithium salt may be used in a concentration ranging from about 0.1 M to about 2.0 M. When the lithium salt is included within the above concentration range, an electrolyte solution may have excellent performance and lithium ion mobility due to optimal electrolyte conductivity and viscosity.

The separator 113 may include any materials commonly used in the conventional lithium battery as long as separating the anode 112 and the cathode 114 and providing a transporting passage of lithium ion. In other words, it may have a low resistance to ion transport and an excellent impregnation for electrolyte solution. For example, it may be selected from glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Optionally, it may have a mono-layered or multi-layered structure.

Hereinafter, the embodiments are illustrated in more detail with reference to examples. These examples, however, are not in any sense to be interpreted as limiting the scope of the invention. Furthermore, what is not described in this disclosure may be sufficiently understood by those who have knowledge in this field and will not be illustrated here.

Preparation of Cathode Active Material

Examples 1 to 4 and Comparative Examples 1 and 2

Ammonia water obtained by mixing distilled water and ammonia at a weight ratio shown in Table 1 was prepared. A NCA material obtained by mixing 50 g of a synthesized and prepared NCA material of $LiNi_{0.90}Co_{0.085}Al_{0.015}O_2$ with the ammonia water in a beaker and agitating the same by a magnetic stirrer in a hot plate for 20 minutes, and then filtering and separating the same was dried in an oven at 120° C. for greater than or equal to 12 hours to provide a cathode active material.

(Manufacture of Lithium Secondary Battery Cell)

92 wt % of each positive active material obtained from Examples 1 to 4 and Comparative Examples 1 and 2, 4 wt % of polyvinylidene fluoride (PVDF), and 4 wt % of acetylene black were mixed and then dispersed in N-methyl-2-pyrrolidone to provide slurry. Then the slurry was coated on an aluminum foil, and then dried and pressed to provide a cathode.

Metal lithium was used as a counter electrode of the cathode to provide a coin-type half-cell. In this case, an electrolyte solution was prepared by dissolving 1.3 M of $LiPF_6$ in a solvent of ethylene carbonate (EC), ethylmethyl carbonate (EMC), and dimethyl carbonate (DMC) (EC:EMC:DMC=volume ratio of 3:4:3).

Evaluation 1: Analysis of Amount of Residual Lithium and Specific Surface Area and pH of Cathode Active Material The results of the analysis of the cathode active materials prepared in Examples 1 to 4 and Comparative Examples 1 and 2 were shown in Table 1 below.

Amount of the residual lithium on the NCA material surface was measured according to an acid-base titration method using a 0.1 mol % HCl solution.

A specific surface area of the cathode active material was measured by a gas adsorption method.

The gas adsorption method is the general method for measuring a specific surface area of the sample surface, a size and distribution of pores by absorbing the sample with nitrogen gas.

TABLE 1

| | Ammonia water (weight ratio) | | Lithium compound (parts by weight) | | Lithium content (parts by weight) | Specific surface area ($m^2$/g) | pH |
|---|---|---|---|---|---|---|---|
| | distilled water | ammonia | $Li_2CO_3$ | LiOH | | | |
| Example 1 | 95 | 5 | 0.42 | 0.19 | 0.13 | 1.45 | 11.55 |
| Example 2 | 90 | 10 | 0.52 | 0.18 | 0.15 | 1.59 | 11.74 |

TABLE 1-continued

| | Ammonia water (weight ratio) | | Lithium compound (parts by weight) | | Lithium content (parts by weight) | Specific surface area ($m^2/g$) | pH |
|---|---|---|---|---|---|---|---|
| | distilled water | ammonia | $Li_2CO_3$ | LiOH | | | |
| Example 3 | 70 | 30 | 0.67 | 0.22 | 0.19 | 1.85 | 11.93 |
| Example 4 | 50 | 50 | 0.82 | 0.23 | 0.22 | 1.72 | 12.01 |
| Comparative Example 1 | 0 | 0 | 1.07 | 1.22 | 0.55 | 0.38 | 12.42 |
| Comparative Example 2 | 100 | 0 | 0.39 | 0.18 | 0.12 | 2.11 | 11.30 |

In Table 1, an amount unit (parts by weight) of the lithium compound and lithium is based on 100 parts by weight of the NCA material.

Referring to Table 1, it is understood that Examples 1 to 4 which were washed with ammonia water showed that the amount of the residual lithium on the surface of the lithium metal compound surface was less than or equal to 0.25 parts by weight, and it was confirmed that a cathode active material having a specific surface area ranging from 0.5 $m^2/g$ to 2.0 $m^2/g$ and pH ranging from 11.5 to 12.1 was formed.

On the other hands, it is understood that Comparative Example 1 which was not washed showed that the amount of the residual lithium was not decreased, and the obtained cathode active material did not satisfy the ranges of the specific surface area and pH. In addition, Comparative Example 2 which was washed with pure water showed that the amount of the residual lithium was decreased, but the obtained cathode active material did not satisfy the ranges of the specific surface area and pH.

Evaluation 2: Electrochemical Characteristics of Lithium Secondary Battery Cell

Lithium secondary battery cells obtained from Examples 1 to 4 and Comparative Examples 1 and 2 were evaluated for a rate capability and cycle-life characteristics under the following conditions, and the results are shown in Table 2.

(1) Evaluation Method of Rate Capability

It was charged at 25° C. under conditions of a charge current of 0.2 C, a charge voltage of 4.3 V, and CC-CV (constant current-constant voltage) and then paused for 10 minutes, and it was discharged at a discharge current of 0.2 C or 1.0 C until a discharge cut-off voltage of 2.8 V. The discharge rate relative to 0.2 C was calculated by Equation 1, and the results are shown in Table 2.

Discharge rate relative to 0.2 C (%)=[discharge capacity at 1.0 C/discharge capacity at 0.2 C]×100    <Equation 1>

(2) Evaluation Method of Cycle-Life Characteristics

It was charged under a constant current until the voltage was reached to 4.3 V at a current of 0.5 C rate at 25° C. and charged under a constant voltage until the current was reached to 0.05 C while maintaining 4.3 V. Subsequently, it was discharged at a constant current of 0.5 C until the voltage was reached to 2.8 V at the discharge, the cycle was repeated for 50 times. Capacity retention rate (CRR) of the coin half cell was calculated by Equation 2, and the results are shown in Table 2.

Capacity retention rate (%)=[discharge capacity at $50^{th}$ cycle/discharge capacity at 1st cycle]×100    <Equation 2>

TABLE 2

| | Initial efficiency (%) | Initial discharge capacity (mAh/g) | 1 C/0.2 C discharge ratio (%) | $50^{th}/1^{st}$ capacity retention (%) |
|---|---|---|---|---|
| Example 1 | 94.5 | 214.3 | 90.1 | 81 |
| Example 2 | 94.2 | 213.1 | 89.8 | 80 |
| Example 3 | 93.5 | 211.6 | 89.7 | 77 |
| Example 4 | 93.4 | 209.7 | 88.9 | 75 |
| Comparative Example 1 | 93.1 | 210 | 89.0 | 76 |
| Comparative Example 2 | 93.0 | 208.7 | 88.4 | 70 |

Referring to Table 2, it is understood that Examples 1 to 4 using a cathode active material obtained by washing the same with ammonia water showed a higher capacity and also showed more excellent cycle-life characteristics and rate capability than Comparative Example 2 washing the same with pure water. Meanwhile, it is understood that Comparative Example 1 which was not washed did not have unfavorable electrochemical characteristics and generated much gas amount, so that the battery stability was deteriorated.

Evaluation 3: Analysis of Gas Generation Amount

Lithium secondary battery cells obtained from Examples 1 to 4 and Comparative Examples 1 and 2 were evaluated for a gas generation amount as follows, and the results are shown in Table 3.

<Measurement Method of Gas Generation Amount>

Metal lithium was used as a counter electrode of the cathode to provide a coin-type half-cell, and it was charged. The cathode was recovered from the charged battery cell and inserted in a pouch for the battery cell together with a predetermined amount of an electrolyte solution and sealed. The prepared pouch was allowed to stand at 85° C. for 3 days, and a volume change was measured according to a buoyancy measurement. As the volume change was the higher, the relative gas generation amount was the higher.

TABLE 3

| | Relative gas generation amount (%) |
|---|---|
| Example 1 | 90 |
| Example 2 | 90 |
| Example 3 | 93 |
| Example 4 | 95 |
| Comparative Example 1 | 100 (reference) |
| Comparative Example 2 | 94 |

Referring to Table 3, Examples 1 to 4 using the cathode active material obtained by washing the same with ammonia water showed reduced gas generation amount, compared to Comparative Example 1 which was not washed. Meanwhile, it is understood that Comparative Example 2 washed with pure water reduced gas generation amount, but deteriorated electrochemical characteristics as in Evaluation 2.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A cathode active material for a lithium secondary battery, the cathode active material comprising:
   a lithium metal compound and a lithium compound on a surface of the lithium metal compound,
   wherein the lithium metal compound is different from the lithium compound,
   the content of lithium contained in the lithium compound is 0.25 parts by weight or less with respect to 100 parts by weight of the lithium metal compound,
   a specific surface area of the cathode active material is 0.5 m²/g to 2.0 m²/g, and
   a pH of the cathode active material is 11.5 to 12.1.

2. The cathode active material of claim 1, wherein the content of lithium contained in the lithium compound is 0.05 parts by weight to 0.25 parts by weight with respect to 100 parts by weight of the lithium metal compound.

3. The cathode active material of claim 1, wherein the specific surface area of the cathode active material is 0.5 m²/g to 1.90 m²/g.

4. The cathode active material of claim 1, wherein the pH of the cathode active material is 11.5 to 11.8.

5. The cathode active material of claim 1, wherein the lithium metal compound comprises a nickel-based oxide represented by Chemical Formula 1:

$$Li_a(Ni_xM'_yM''_z)O_2 \qquad \text{[Chemical Formula 1]}$$

wherein, in Chemical Formula 1,
M' is at least one selected from Co, Mn, Ni, Al, Mg, and Ti, M" is at least one selected from Ca, Mg, Al, Ti, Sr, Fe, Co, Mn, Ni, Cu, Zn, Y, Zr, Nb, and B, 0.8<a≤1.2, 0.6≤x≤1, 0≤y≤0.4, 0≤z≤0.4, and x+y+z=1.

6. The cathode active material of claim 5, wherein Chemical Formula 1 is a lithium nickel-based oxide represented by Chemical Formula 2:

$$Li_a(Ni_xCo_yM''_z)O_2 \qquad \text{[Chemical Formula 2]}$$

wherein, in Chemical Formula 2,
M" is at least one element selected from Al and Mn, 0.8<a≤1.2, 0.6≤x≤1, 0≤y≤0.4, 0≤z≤0.4, and x+y+z=1.

7. The cathode active material of claim 1, wherein the lithium compound comprises $Li_2CO_3$, LiOH, or a combination thereof.

8. A lithium secondary battery comprising a cathode comprising the cathode active material of claim 1.

9. A method for preparing a cathode active material for a lithium secondary battery, the method comprising
   washing a first active material with ammonia water to obtain a second active material, the second active material comprising a lithium metal compound and a lithium compound on a surface of the lithium metal compound,
   wherein the lithium metal compound is different from the lithium compound,
   the content of lithium contained in the lithium compound is 0.25 parts by weight or less with respect to 100 parts by weight of the lithium metal compound,
   a specific surface area of the cathode active material is 0.5 m²/g to 2.0 m²/g, and
   a pH of the cathode active material is 11.5 to 12.1.

10. The method of claim 9, wherein the ammonia water comprises water and ammonia in a weight ratio of 50:50 to 99:5.

11. The method of claim 9, wherein pH of the ammonia water is 11 to 13.

* * * * *

UNITED STATES PATENT AND TRADEMARK OFFICE
CERTIFICATE OF CORRECTION

| | | |
|---|---|---|
| PATENT NO. | : 11,894,554 B2 | Page 1 of 1 |
| APPLICATION NO. | : 16/320057 | |
| DATED | : February 6, 2024 | |
| INVENTOR(S) | : Jungmin Han et al. | |

It is certified that error appears in the above-identified patent and that said Letters Patent is hereby corrected as shown below:

In the Claims

In Column 12, Line 4, in Claim 6, in Chemical Formula 2, delete "$Li_a(Ni_xCO_yM''_z)O_2$" and insert -- $Li_a(Ni_xCo_yM''_z)O_2$ --.

Signed and Sealed this
Twenty-eighth Day of May, 2024

*Katherine Kelly Vidal*
Katherine Kelly Vidal
*Director of the United States Patent and Trademark Office*